United States Patent
Sreeju et al.

(10) Patent No.: US 12,489,385 B2
(45) Date of Patent: Dec. 2, 2025

(54) ELECTRICAL MACHINE OF A VEHICLE

(71) Applicant: TVS MOTOR COMPANY LIMITED, Chennai (IN)

(72) Inventors: S Nair Sreeju, Chennai (IN); Dhinagar Jabez, Chennai (IN); Choudhary Sourabh, Chennai (IN)

(73) Assignee: TVS Motor Company Limited, Chennai (IN)

(*) Notice: Subject to any disclaimer, the term of this patent is extended or adjusted under 35 U.S.C. 154(b) by 260 days.

(21) Appl. No.: 18/245,607

(22) PCT Filed: Dec. 30, 2020

(86) PCT No.: PCT/IN2020/051067
§ 371 (c)(1),
(2) Date: Mar. 16, 2023

(87) PCT Pub. No.: WO2022/064510
PCT Pub. Date: Mar. 31, 2022

(65) Prior Publication Data
US 2023/0361710 A1    Nov. 9, 2023

(30) Foreign Application Priority Data

Sep. 26, 2020 (IN) .............................. 202041041887

(51) Int. Cl.
*H02P 25/22* (2006.01)
*H02K 3/28* (2006.01)
(Continued)

(52) U.S. Cl.
CPC .............. *H02P 25/22* (2013.01); *H02K 3/28* (2013.01); *H02K 11/33* (2016.01); *H02P 29/50* (2016.02)

(58) Field of Classification Search
CPC .......... H02P 25/22; H02P 29/50; H02P 6/007; H02P 2207/05; H02P 2207/07;
(Continued)

(56) References Cited

U.S. PATENT DOCUMENTS

2003/0085627 A1* 5/2003 Lipo ..................... H02K 3/28
                                                        310/12.22
2019/0068018 A1* 2/2019 Hori ..................... H02K 3/28

FOREIGN PATENT DOCUMENTS

EP       3439156 A1    2/2019
JP    2019-22299 A     2/2019

OTHER PUBLICATIONS

International Search Report issued in corresponding International Application No. PCT/IN2020/0510674 mailed Jun. 16, 2021 (4 pages).
(Continued)

*Primary Examiner* — Tulsidas C Patel
*Assistant Examiner* — Mohammed Ahmed Qureshi
(74) *Attorney, Agent, or Firm* — Osha Bergman Watanabe & Burton LLP (57) ABSTRACT

A six phase stator winding of a motor that has reduced MMF harmonics characteristics is provided. The stator winding has two sets: a first set and a second set of three phase winding connection. The first set and the second set of the three phase winding connection are connected parallel to each other, such that the two sets of the three-phases are shifted by 30-degree electrical angle with respect to each other, where the second set of is leading.

13 Claims, 7 Drawing Sheets

(51) Int. Cl.
*H02K 11/33* (2016.01)
*H02P 29/50* (2016.01)

(58) Field of Classification Search
CPC ......... H02P 25/03; H02P 25/022; H02K 3/28; H02K 11/33; H02K 21/16
See application file for complete search history.

(56) References Cited

OTHER PUBLICATIONS

Written Opinion issued in corresponding International Application No. PCT/IN2020/0510674 mailed Jun. 16, 2021 (10 pages).

* cited by examiner

ELECTRICAL MACHINE OF A VEHICLE

TECHNICAL FIELD

The present subject matter described herein generally relates to a vehicle, and particularly but not exclusively relates to an electrical machine of a vehicle.

BACKGROUND

Conventionally, the motor that converts the alternating current into mechanical power by using an electromagnetic induction phenomenon is called an Alternating Current (AC) motor. This motor is driven by an alternating current. The stator and the rotor are the two most important parts of the AC motors. The stator is the stationary part of the motor, and the rotor is the rotating part of the motor. The AC motor can be either single phase or three phase.

The three phase AC motors are mostly applied in the industry for bulk power conversion from electrical to mechanical. For small power conversion, the single phase AC motors are used. Usually, the single phase AC motor is small in size, and provides a variety of services in the home, office, business concerns, factories, etc. Almost all the domestic appliances such as refrigerators, fans, washing machine, hair dryers, mixers, etc., use single phase AC motor.

The AC motor is mainly classified into two types. They are the synchronous motor and the induction motor. Synchronous motors convert the AC electrical power into mechanical power and are operated at synchronous speed. When electrical supply is given to synchronous motor, a revolving field is set up. This field tries to drag the rotor with it, but faces hindrance because of the rotor inertia. Hence, no starting torque is produced. Thus, inherently synchronous motors are not self-starting motors. The motor which can convert the AC electric power into mechanical power by using an electromagnetic induction phenomenon in called an induction motor. The induction motor is mainly classified into two types, i.e., a single phase induction motor and a three phase induction motor.

BRIEF DESCRIPTION OF THE DRAWINGS

The detailed description is described with reference to a two wheeled vehicle along with the accompanying figures. The same numbers are used throughout the drawings to reference like features and components.

DETAILED DESCRIPTION

Conventionally, in an induction motor the rotor winding serves as both the armature winding and field winding and when the stator windings are connected to an AC supply a flux is produced in the air gap. The flux rotates at a fixed speed called synchronous speed. This rotating flux induces voltage in the rotor winding. If the rotor circuit is closed, current flows through the rotor winding, reacts with the rotating flux and thereby produces a torque. In the steady state, the rotor rotates at a speed which is very close to synchronous speed.

Currently, permanent magnet synchronous motors (PMSMs) are used instead of AC induction motors due to their advantages over the AC induction motors. These advantages include higher torque with smaller frame size and no rotor current. These permanent magnet synchronous motors are brushless and have very high reliability and efficiency.

The PMSMs exhibit high torque density and high energy efficiency over a wide operation range, due to the presence of the permanent magnets. Therefore, they have increasingly been employed in a variety of applications, such as industrial drives, hybrid and electric vehicles, wind turbine, aerospace, marine, and domestic appliances, etc. With their high power-to-size ratio, the PMSMs can help in making the motor design smaller without the loss of torque. Subject to the locations of the permanent-magnets, PMSMs can be classified into Surface-mounted Permanent-magnet Machines (SPMs) and Interior Permanent-magnet Machines (IPMs). With magnets mounted on the rotor surface, SPMs produce torque by the interaction of the magnetic field contributed by permanent-magnets with the armature reaction field produced by the stator magnetic-motive force (MMF).

Therefore, SPMs exhibit a relatively linear torque-current characteristic, good controllability, and low torque ripple. Nevertheless, the surface-mounted magnets result in a large equivalent air-gap because the relative permeability of magnets is close to 1. Hence, synchronous inductance of the machine is relatively low, leading to a high characteristic current, defined as the ratio of the PM flux to the synchronous inductance, and thereby low field weakening capability.

In some known arts concentrated windings on SPMs has been employed and hence the developed SPM is capable of delivering constant power over a specified speed range by increasing the inductance and meeting the optimum field weakening conditions.

In some other known arts, a synthesis of SPMs with concentrated windings is performed and subsequently their performances are compared with those of SPMs using conventional distributed windings. In such known arts it is shown that by using the concentrated winding configuration, the copper loss can be reduced dramatically owing to both the short end-winding length and the high copper packing factor (if the segmented stator structure is employed). Moreover, the cogging torque can also be significantly reduced when the least common multiple of the slot number and the pole number increases. Therefore, SPMs with concentrated windings exhibit advantages such as high torque density, low copper loss, good field weakening capability, and low cogging torque.

However, by employing concentrated winding configurations in SPMs, the rotor magnets are subjected to a large amount of stator MMF harmonics which are asynchronous with the rotor speed, and consequently incur high eddy current loss. For example, in a two pole three phase motor with twelve slots design, a significant 5th and 7th harmonics in the magneto motive force (MMF) is noticed, which can result in increased rotor loss, hence reduced performance.

This can further lead to a high rotor temperature particularly at high speeds, and hence the rotor magnets will suffer from a high risk of irreversible demagnetization.

Compared with SPMs, IPMs have magnets buried in the rotor iron. The IPM rotor topology gives rise to asaliency in reluctances. To maximize the reluctance torque, the distributed winding configurations are usually employed in IPMs.

However, compared to the concentrated windings, the conventional distributed windings have lower copper packing factor (slot fill factor), longer end-winding length, higher cogging torque, and less fault tolerant owing to higher mutual inductance and winding overlapping.

Thus, the concentrated winding configurations are of potential to be employed in IPMs, given that the lower and higher order space harmonics in the stator MMF can be suppressed to a desirable level. This can increase IPMs' reluctance torque production, reduce the eddy-current losses in both rotor magnets and rotor iron, and suppress acoustic noise and vibrations. Therefore, both SPMs and IPMs can greatly benefit from the reduction of the stator MMF harmonics in the concentrated windings.

In other known arts MMF harmonic reduction techniques are employed in three-phase motors. Such techniques include MMF harmonic reduction by alteration of the stator geometry which requires optimization of the motor design. For example, increasing the number of slots of the stator and use of multiple layer of the winding. Such alteration of the stator geometry results in increase of the size and the weight of the motor.

The increasing of the number of slots of the stator without increasing the size and weight of the motor is ideally not desired to be employed in a motor which is designed to rotate at a high speed. This is because, with the increase in the number of slots in the same available space, the material width between the slots decreases. This decrease in the material width compromises with the torque of the motor, when working at high speeds. Also there exists a challenge of improving reliability of the motor since known art designs of motors come to halt in case of any fault in the windings of the motor.

Hence there is a need of a reliable and robust winding scheme of a motor which results in significant reduction in the MMF harmonics without changing the stator geometry; and size and weight of the motor.

The present subject matter has been devised in view of the above circumstances as well as solving other problems of the known art.

In an embodiment of the present subject matter, the present subject matter relates to a winding scheme of an electrical machine, for example a motor that has reduced MMF harmonics characteristics. As per an aspect of the present embodiment the claimed winding scheme has total six phases that includes two separate sets of three phase winding connection, instead of a single winding connection, when compared with a conventional winding scheme of a motor. The second set of three phase system has a separate power supply. As per another aspect of the present embodiment the two separate sets of the three-phase winding connection has a phase shift of 30 degree where the coil in the leading slot i.e. second set of three phase system is leading and hence the two sets of power supply has a phase difference of 30 degree.

As per an efficacy of the present embodiment because of the two sets of three phase winding connection, in case of fault in any one set of winding the other set can keep the motor working and hence aid in increasing the redundancy and reliability of the motor.

As per another aspect of the present embodiment the fundamental harmonics are dominating while the higher order harmonics for example, a fifth and a seventh harmonics are considerably reduced, when compared with a three-phase two pole conventional winding scheme of a motor. Resultant to which as an efficacy, the claimed winding scheme has improved fundamental harmonics when compared to the fundamental harmonics of a conventional winding scheme.

As per another embodiment of the present subject matter the claimed scheme of winding scheme of the motor is capable of being applied to a motor design of a two wheeled electric vehicle, a three wheeled electric vehicle and designing of a motor for industrial applicability.

As per another efficacy of the present claimed subject matter, the claimed winding scheme is capable of achieving reduced harmonics without increasing the weight or size of the motor on which the present claimed winding scheme is being applied. Therefore the present claimed winding scheme does not involve any vehicular structural layout changes and enables a compact design of the vehicle.

As per another efficacy the present claimed subject matter, since the claimed winding design does not lead to altering of the stator geometry, the torque of the motor is maintained even at high speed and therefore efficient high-speed operation of the motor is maintained and better motor performance is achieved.

Exemplary embodiments detailing features regarding the aforesaid and other advantages of the present subject matter will be described hereunder with reference to the accompanying drawings. Various aspects of different embodiments of the present invention will become discernible from the following description set out hereunder. Rather, the following description provides a convenient illustration for implementing exemplary embodiments of the invention. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof. Further, it is to be noted that terms "upper", "down", "right", "left", "front", "forward", "rearward", "downward", "upward", "top", "bottom", "exterior", "interior" and like terms are used herein based on the illustrated state or in a standing state of the two wheeled vehicle with a driver riding thereon. Furthermore, arrows wherever provided in the top right corner of figure(s) in the drawings depicts direction with respect to the vehicle, wherein an arrow F denotes front direction, an arrow R indicates rear direction, an arrow Up denotes upward direction, an arrow Dw denotes downward direction, an arrow RH denotes right side, and an arrow LH denotes left side. Also, it is to be understood that the phraseology and terminology used herein is for the purpose of description and should not be regarded as limiting.

Figure 1:
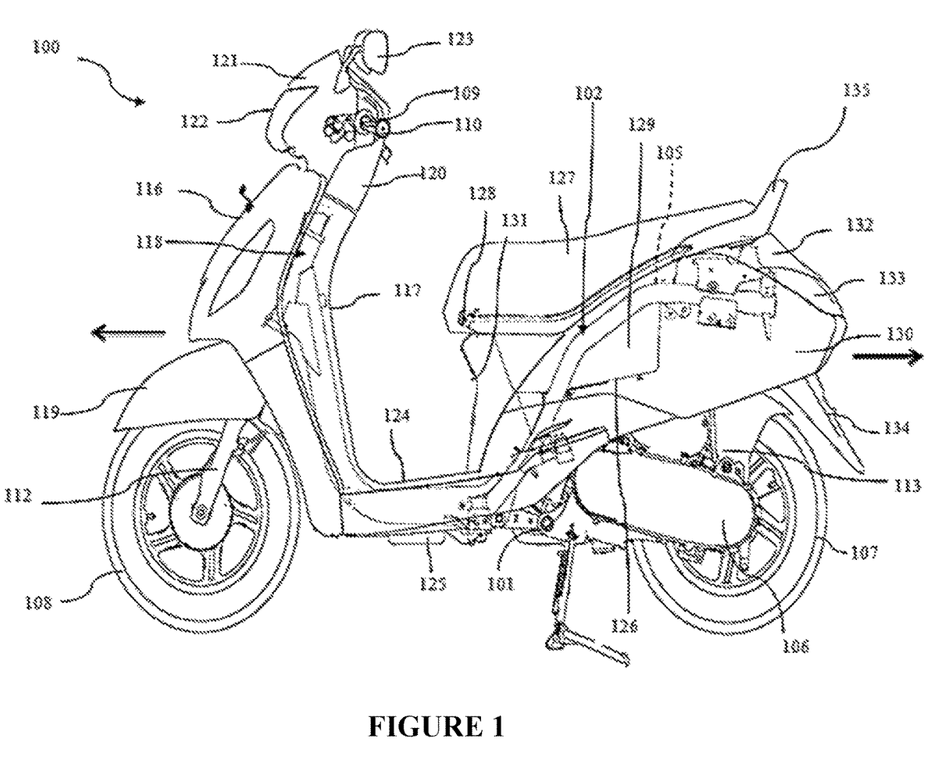
FIG. 1 illustrates a side view of a conventional scooter type vehicle when viewed from left hand side of the rider while he is in riding position.

FIG. 1 illustrates a side view of a conventional scooter type vehicle 100 when viewed from left hand side of the rider while he is in riding position. The conventional scooter type vehicle 100 is generally provided with a power unit 101 that generates the power required to propel the vehicle forward, and a frame 102, which further includes a front frame (not shown), a central frame (not shown) and a rear frame 105 joined together to form the frame 102, and a power transmission unit 106, which transfers the power generated by the power unit 101 to the rear wheel 107, and a front wheel 108 at front portion of the vehicle 100 below the front frame which is steerable by the rider, and a handle bar unit 109 comprising of a left handle bar grip 110 and a right handle bar grip (not shown) which the rider can use to steer the front wheel 108 in the desired direction, and a front suspension unit 112 for smooth force transmission to the front wheel 108, and a rear suspension unit 113 for smooth force transmission to the rear wheel 107. In such vehicles especially which are fast charging, high voltage system parts of battery, controller, motor, charger, charging socket and DC charging protective relays needs to be packaged. Therefore, at times all high voltage system parts are packaged nearby in one location, which reduces the high voltage wires length connecting these parts and thus increasing safety and minimizing power loss.

The front frame (not shown) includes a head tube (not shown) and a down tube (not shown); the head tube supports the front suspension unit 112, which further supports the handle bar unit 109 in a steerable manner and the down tube extends rearward and downward of the head tube. The central frame has two tubes (not shown) on the left and right of the conventional scooter type vehicle 100 extending away and then substantially parallel from each other in a rearward direction. The left and right tubes are connected by a cross frame (not shown) extending in vehicle width direction. These left and right tubes further extend rearward and upward to form the rear frame 105, which supports other units of the vehicle 100 at rear portion.

A front panel 116 is provided ahead of the head tube for covering the head tube when viewed from the front of the vehicle 100. A panel rear (not shown), extending downwards from the head tube, covers the head tube and down tube from the rear side. A front fender 119 is provided above the front wheel 108, in the vicinity of the front suspension unit 112, to prevent mud splashing onto the internal articles of the vehicle 100 at the front portion. A handle bar panel rear (not shown), at least partly covers the handle bar unit 109, from the rear side. A handle bar front panel 121 at least partly covers the handle bar unit 109 from front side. A glove box 118 is mounted on the panel rear, below the handle bar panel rear and above the floor board 124. A headlamp unit 122 is disposed on the handle bar front panel 121 and mirror units 123 are disposed on the handle bar unit 109 through the handle bar front panel 121. As there are many electrical parts in the vehicle 100. Therefore, the routing of wiring harness in many such vehicles 100 is done along an RH side of the frame 102. The fuel tank (not shown) being positioned in a floor board 124 area, the wires are routed to connect to the floor board 124 mounted electrical parts like fuel pump, fuel sensor unit and then the wires are extended to connect to the side stand switch.

An interfacing portion of the handle bar front panel 121 and the handle bar panel rear has a cut-out zone (not shown) on left side and right side for projecting the left handle bar grip 110 and right handle bar grip respectively. A floor board 124 as leg resting panel is provided above the central frame to cover a top portion of the central frame and a bottom panel 125 is provided below the central frame to cover a bottom portion of the central frame.

On the rear side, a utility unit 126 is disposed, at the space between the left and right tubes at the rear portion of the vehicle 100 above the power unit 101, to store articles. The utility unit 126 is mounted onto the cross tube at the front portion and rear portion, thus getting supported by the rear frame. A seat unit 127 is provided, above the utility unit 126 and extending throughout the rear frame, for the rider to sit over and maneuver the vehicle 100. The seat unit 127 is mounted onto the vehicle 100 through a hinge unit 128, provided on the utility unit 126, such that the seat can be opened by rotating it about the hinge unit 128 to provide access to the storage area 129 of the utility unit 126.

A side panel LH 130 is provided on the left side of the rear frame and a side panel RH (not shown) is provided on the right side of the rear frame so as to cover the internal components when viewed from left and right sides of the conventional scooter type vehicle 100 respectively. A front cover 131 is disposed ahead of the utility unit 126 and below the seat unit 127 to cover the internal components, such as the power unit 101, frame 102 in a vehicle perspective view. A rear cover 132 is provide rearward to the rear frame and an opening formed by assembling the rear cover 132 and the side panel units 130 is used to place a tail lamp 117 on the rear side. A rear fender 120 is disposed above the rear wheel 107 to prevent mud splashing onto internal components while riding. A grab rail 111 is disposed in the vicinity of the seat unit 127, on the rear portion of the conventional scooter type vehicle 100, to enable a pillion rider to grab for support.

Figure 2:
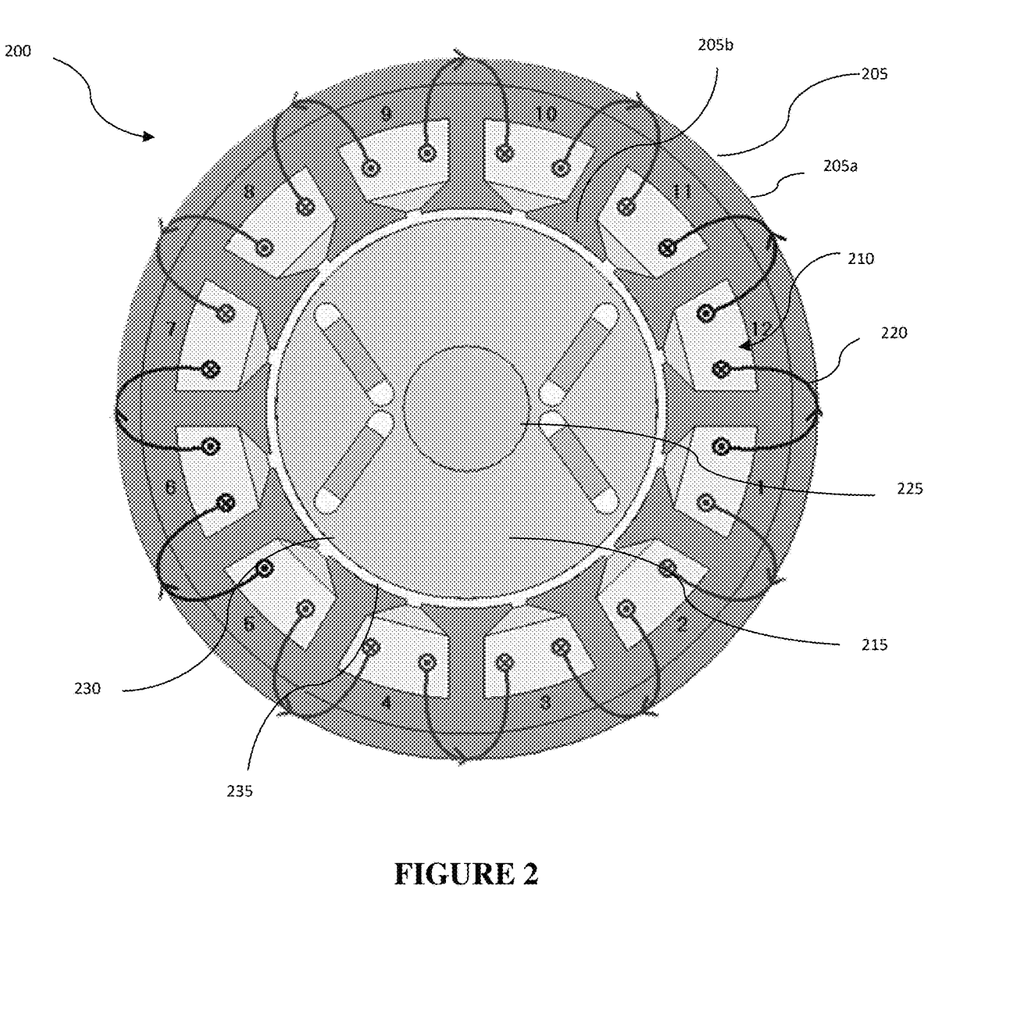
FIG. 2 illustrates a cross section of a two pole and twelve slot motor, as per an embodiment of the present subject matter.

FIG. 2 illustrates a cross section of a two pole and twelve slot motor 200, as per an embodiment of the present subject matter. The main components of the motor 200 are a stator 205 and a rotor 215. The stator 205 is the fixed part of the motor 200 and the rotor 215 is the rotating part of the motor 200. For most motors 200 the rotor 215 is located inside the stator 205.

The stator 205 consists of a stator outer frame 205a and a stator core 205b with a predefined number of stator windings 220. The stator outer frame 205a is called back-iron and 205b is called teeth of the stator 205. The stator core 205b is assembled from thin-sheet technical steel, usually 0.5 mm thick, covered with insulating varnish. Stator core 205b laminations significantly limit the losses (eddy currents losses) arising in the process of magnetic reversal of the stator core 205b by a rotating magnetic field. The stator windings 220 are wound across the motor 200 by means of plurality of slots 210 present on the stator core 205b.

The rotor 215 of the electric motor 200 consists of a core and a shaft 225. The rotor core also has a laminated construction. There is a small distance between the rotor 215 and the stator 205 of the motor 200, called as an air gap 235, which typically ranges between 0.5 mm to 2 mm.

As per the present illustration, a three-phase set of stator windings 220 is inserted in the designated slot 210 present on the inside portion of the stator 205. These stator windings 220 may be connected either in a wye configuration, normally without external connection to the neutral point, or in a delta configuration. The rotor 215 consists of a cylindrical iron core with magnets (not shown) placed in slots 210 around the surface. In the most usual form, these rotor magnets (not shown) are connected together at each end of the rotor 215 by a conducting end ring 230. The principle of operation of a three-phase motor 200 is based on the ability of a three-phase stator windings 220 to create a rotating magnetic field when it is connected to a three-phase electric power system. Since the stator windings 220 are connected to a three-phase electric supply, therefore a set of three sinusoidal currents flow in the stator windings 220. As a result of which a magnetic field across the air gap 235 of the electric motor 200 is produced.

Figure 2A:
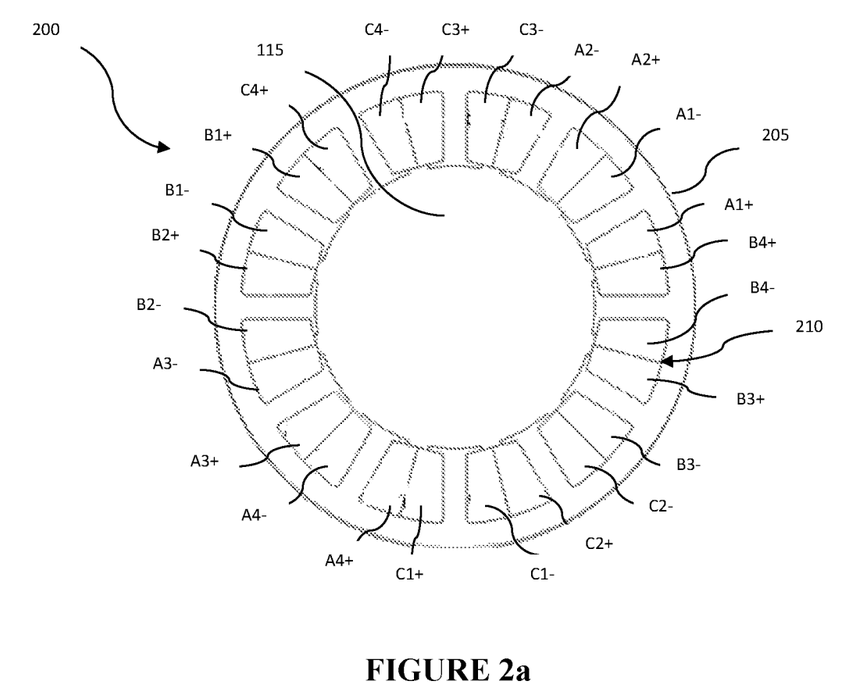
FIG. 2a illustrates a cross section of a two pole and twelve slot motor, as per an embodiment of the present subject matter.

FIG. 2a illustrates a cross section of a two pole and twelve slot motor 200, as per an embodiment of the present subject matter. The three phases of each three phase motor 200 include phase A, phase B and phase C. A1, A2, A3 and A4 are the four coils of Phase A. Similarly, B1, B2, B3 and B4 are the four coils of Phase B and C1, C2, C3, and C4 are four coils of the Phase C. The positive sign of the respective coil, for example, A1+, represents one end of the respective coil and the negative sign of the respective coil, for example, A1−, represents another end of the respective coil. The positive or negative sign notation after coil numbering represents the direction of flow of the current in that respective coil. The positive sign (A1+, A2+ etc.) represents the ongoing path of the current and similarly negative sign (in A1−, A2− etc.) denotes the return path of the supplied current. Therefore, as the motor winding of the present illustrated figure is a double layer winding, there are total 12 coils in the stator windings 220 (shown in FIG. 2). Since the present motor 200 is a three-phase motor so, there are 4 coils for every phase (A or B or C).

The winding of four coils of every phase (A or B or C) is placed inside the slots 210 are wound across the teeth 205*b* present on the stator 205 of the motor 200. In the present illustrated figure the number of slots 220 is 12.

Figure 2B:
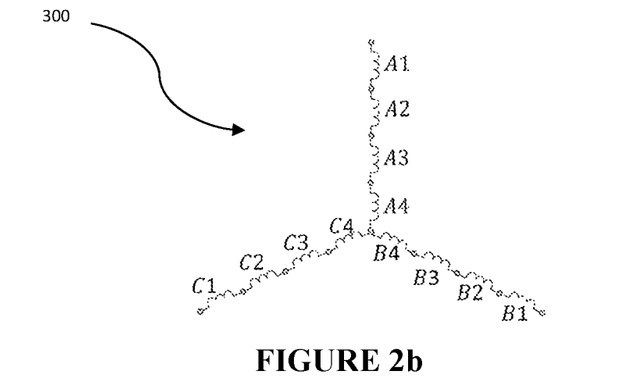
FIG. 2b illustrates a schematic conventional three phase winding connection of a two pole and twelve slot motor, with a concentrated conventional winding pattern.

FIG. 2b illustrates a schematic conventional three phase winding connection 300 of a two pole and twelve slot motor 200, with a concentrated conventional winding pattern. In case of three-phase supply all the four coils of each phase are connected in series. For example, for phase A, the coils A1, A2, A3 and A4 are connected in series. Similarly, for phase B, the coils B1, B2, B3 and B4 are connected in series. Similarly for phase C, the coils C1, C2, C3 and C4 are connected in series.

Figure 2C:
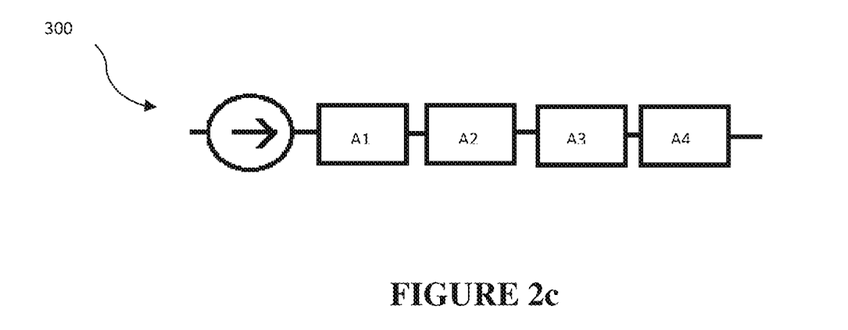
FIG. 2c illustrates a block diagram of conventional three phase winding connection all four coils of a phase A.

FIG. 2c illustrates a block diagram of conventional three phase winding connection 300 of all four coils of a phase A. In case of three-phase supply all the four coils of each phase are connected in series. For example, for phase A, the coils A1, A2, A3 and A4 are connected in series. Such series connection results in decreasing the motor 200 redundancy, as failure of one coil can result in the failure of the motor 200.

Figure 2D:
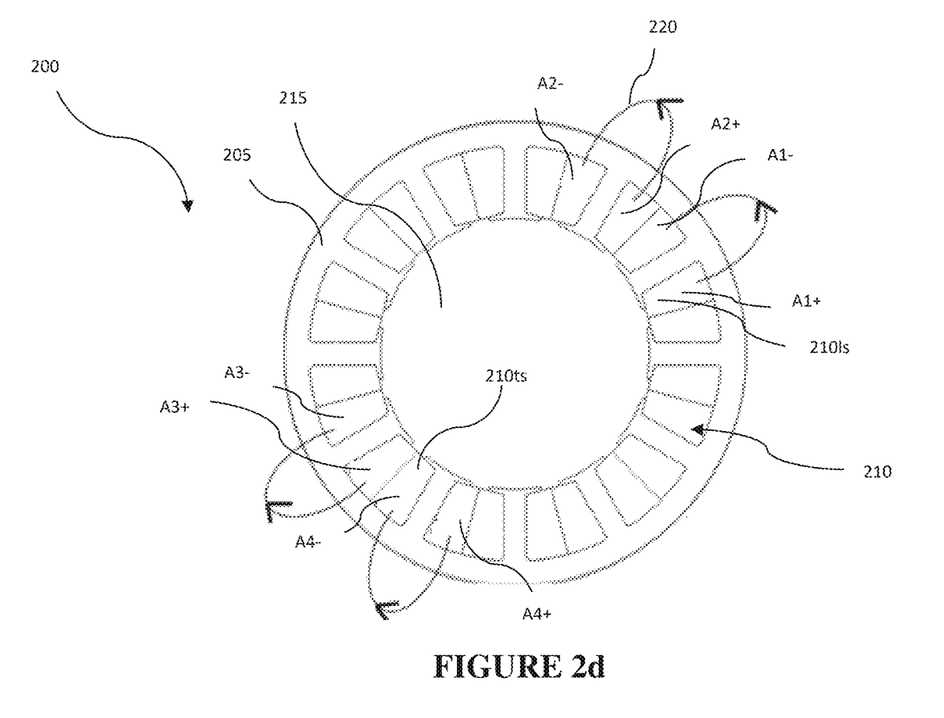
FIG. 2d illustrates the four coils of phase A and the direction of flow of current on the stator windings as per an embodiment of the present subject matter.

FIG. 2d illustrates the four coils of phase A and the direction of flow of current on the stator windings 220 as per an embodiment of the present subject matter. The present illustration shows four coils of phase A, i.e. A1, A2, A3 and A4 as stator windings 220. The arrows present on the stator windings 220 shows the direction of flow of current, that is the current is flowing from the positive end of each coil towards its respective negative end. As per the illustration the motor 200 moves in an anticlockwise direction. The plurality of slots 210 present on the stator core 205*b* (shown in FIG. 2) comprises of at least one leading slot 210*ls* and at least one lagging slot 210*ts*.

Figure 3A:
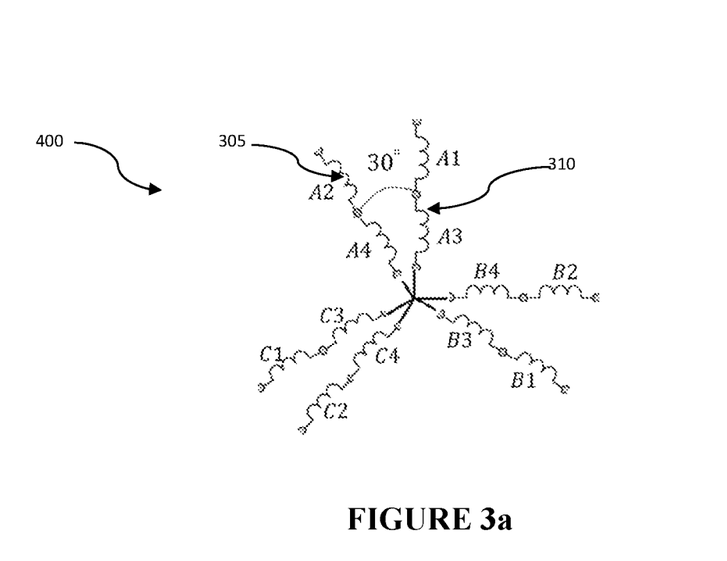
FIG. 3a illustrates a six phase winding connection of a three phase motor as per an embodiment of the present subject matter.

FIG. 3a illustrates a six phase winding schematic connection 400 of a three phase motor 200 as per an embodiment of the present subject matter. The present illustration shows the winding connection of a two pole three-phase motor 200 that includes two coils for each phase (A or B or C) for both set of three-phase connection. Each phase (A or B or C) includes a first set 305 and a second set 310. Each of the first set 305 and the second set 310 further include two coils per set. For example, for phase A alone, the stator windings 220 is done in a manner that phase A has a first set 305 including A2 and A4 and phase A has a second set 310 including A1 and A3. The first set 305 and the second set 310 have two separate power supply with a suitable phase-shift among them. Resultant to which waveform of A1 is similar to A3 and waveform of A2 is similar to A4. Because of this two sets of three phase winding connection, in case of a fault in any one of the set of the six phase winding connection 400, i.e. either the first set 305 or the second set 310, the other set is capable of keeping the motor 200 in working condition and hence redundancy of the motor 200 is increased and thereby reliability is improved.

The second set 310 of each of the 3 phases (A or B or C) is positioned such that the second set 310 is always 30-degree electrically leading with respect to the first set 305 of each of the three phases (A or B or C) of the six phase winding connection 400.

As per the proposed six phase winding connection 400, the two pole three phase motor 200 has poly-phase offset of 1 slot i.e. the second set 310 of three phase winding is starting from one slot 210 (shown in FIG. 2) next to the starting slot 210 of the first set 305 of stator windings 220 (shown in FIG. 2). The second set 310 of the stator windings 220 is leading with respect to the first set 305, as the second set 310 starts from the leading slot 220 of the stator 205 (shown in FIG. 2).

The winding connection of two separate three phase motor 200 is shown in FIG. 3a, which illustrates that the coils A1 and A3 belong to a single subset, while the coils A2 and A4 belong to another subset. When the rotor 215 is moving in anticlockwise direction, at any point of time, as shown in FIG. 2d, the second subset starts with offset of 1 slot and there is a poly-phase offset of one slot 110 between at least one leading slot 210*ls* and at least one lagging slot 210*ts*. Similar winding scheme is followed for subset of coils B and C.

As per the proposed six phase winding connection 400, the slot pitch is 30-degree mechanical, as there are 12 slots in the stator 205.

Therefore, the slot pitch mechanical $\theta_m$=(360 degree/number of slots); =360 degree/12=30 degree Similarly, as per the proposed six phase winding connection 400, the slot pitch in the electrical degree $\theta_e$ is also 30-degree electrical as there are two poles in the motor 200.

$$\theta_e = \frac{P}{2}\theta_m$$

where P=number of poles $$\theta_e = \frac{2}{2}\theta_m$$

$\theta_e$=$\theta_m$=30 degree

Therefore, the back EMF induced in the leading slot 210ls will aid the leading slot 210ls to lead the trailing slot 210ts by 30-degree angle. For example, the leading slot 210ls includes the slots 210 containing A1 and A3; and trailing slots 210ts include slots containing A2, A4. Since the back-EMF in leading slot 210ls is 30 degree leading which is induced by the rotor 215 magnetic field; and as per present subject matter the current supply in the leading slot 210ls is at 30 degree with respect to the current supplied in the lagging slot 210ts, thus maximizing the interaction between the two fields and enabling achievement of the best possible MMF harmonics reduction.

With reduced MMF harmonics without increasing the weight or size of the motor 200 the present claimed six phase winding connection 400 scheme does not involve any vehicular structural layout changes.

Because of the present configuration of six phase winding connection 400 the fundamental harmonics dominates while the higher order harmonics for example, a fifth and a seventh harmonics are considerably reduced, when compared with a three-phase two pole conventional winding scheme of a motor 200. The reduction of the fifth and the seventh harmonic of the motor 200 and improvement of fundamental harmonic, reduces the rotor 215 losses of the motor 200, hence increases the motor 200 performance.

Moreover, the proposed design does not lead to altering of the geometry of the stator 205 and hence aids in reducing the size and weight of the motor 200. Thus the torque of motor 200 is maintained even at high speeds of the motor 200 and therefore efficient high-speed operation of the motor 200 is maintained and better motor performance is achieved when compared with motors 200 having three phase conventional winding connection 300 (shown in FIG. 2b).

Figure 3B:
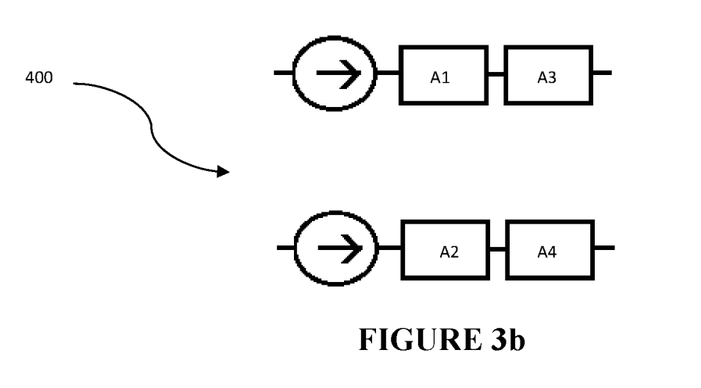
FIG. 3b illustrates a block diagram of a motor using a six phase winding connection as per an embodiment of the present subject matter.

FIG. 3b illustrates a block diagram of the winding connections of a motor 200 using a six phase winding connection 400 as per an embodiment of the present subject matter. As per the present illustrated block diagram for the six phase winding connection 400 includes a two phase set of three phase system. The coils are connected in set of two coils in series. For example, for phase A, two sets of coils are present. One set includes coil A1 and coil A3 and the other set includes coil A2 and coil A4. And these two sets 305, 310 (shown in FIG. 3a) further have separate power supply.

Figure 4:
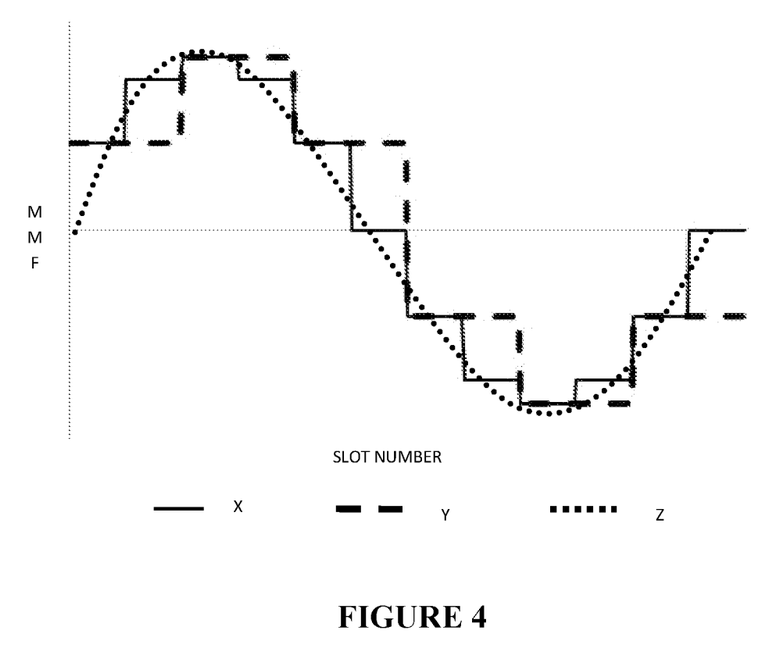
FIG. 4 illustrates a graph showing per slot MMF distribution in a motor using both conventional three phase winding connection and presently claimed six phase winding connection.

FIG. 4 illustrates a graph showing MMF distribution per slot 210 (shown in FIG. 2) in a motor 200 using both conventional three phase winding connection 300 and presently claimed six phase winding connection 400. As per the illustrated graph the proposed six-phase winding configuration 300 is depicted by straight line X and the conventional three phase winding connection 300 is depicted by dashed line Y. A sinusoidal wave in form of dotted Z line is drawn mapping the MMF distribution of both X and Y line on the graph. It is clear from the graph that the MMF distribution of the line X is more sinusoidal when compared to the MMF distribution of the line Y, because the line graph depicting X shows more steps when compared to the line graph depicting Y. Also it can be seen that the deviation of the line X from the sine wave Z at any point of time is less with respect to deviation of line Y which depicts more sinusoidal form of line X. Therefore, more sinusoidal form of MMF distribution depicts lesser harmonics hence reduced eddy current losses. This further result in decreased rotor 215 loss hence increased performance.

Figure 5:
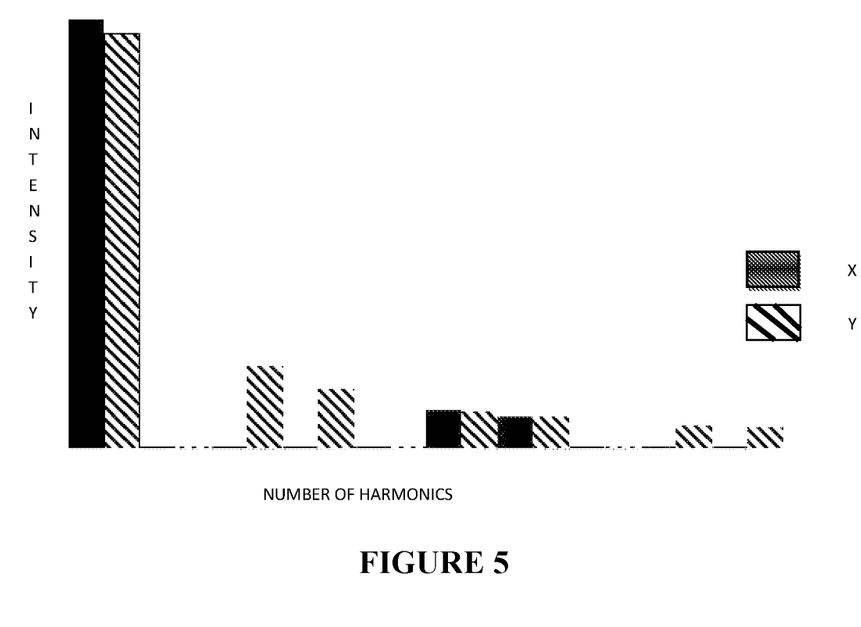
FIG. 5 illustrates a graph between the intensity of the harmonics and the number of harmonics produced while using both conventional three phase winding connection and presently claimed six phase winding connection in a motor.

FIG. 5 illustrates a graph between the intensity of the harmonics and the number of harmonics produced while using both conventional three phase winding connection 300 and presently claimed six phase winding connection 400 in a motor 200. The graph illustrates that the intensity of the harmonics especially, the intensity of the fifth and seventh harmonics are considerably reduced in situation where the proposed six phase winding connection 400 is used as depicted by dashed Y bar. The dark shade X bar depicts number of harmonics produced when conventional winding methods are used. The graph further depicts that it is the first harmonic, that is the fundamental harmonic, and is additionally improved when proposed six phase winding connection 400 is used. This improving of the fundamental harmonic and the considerable reduction of the fifth and seventh harmonic aid in reduction of the iron losses of the motor 200. Hence reduced eddy current losses are reduced, which further results in decreased rotor 215 loss and increased performance of the motor 200.

Many modifications and variations of the present subject matter are possible in the light of above disclosure. Therefore, within the scope of claims of the present subject matter, the present disclosure may be practiced other than as specifically described.

LIST OF REFERENCE NUMERALS

| | |
|---|---|
| 100: Conventional scooter type vehicle | 123: Mirror unit |
| 101: Power unit | 124: Floor board |
| 102: Main frame | 125: Bottom panel |
| 105: Rear frame | 126: Utility unit |
| 106: Power transmission unit | 127: Seat unit |
| 107: Rear wheel | 128: Hinge unit |
| 108: Front wheel | 129: Storage area utility unit |
| 109: Handle bar unit | 130: Side panel LH |
| 110: Left handle bar grip | 131: Front cover |
| 111: Grab rail | 132: Rear cover |
| 112: Front suspension unit | 200: Motor |
| 113: Rear suspension unit | 205: Stator |
| 116: Front panel | 205a: Stator outer frame |
| 117: Tail lamp | 205b: stator core |
| 118: Glove box | 210: Slots |
| 119: Front fender | 210ls: Leading slot |
| 120: Rear fender | 210ts: Lagging slot |
| 121: Handle bar front panel | 215: Rotor |
| 122: Head light | 220: Stator winding |
| 225: Shaft | C1, C2. C3, C4: Coils of phase C |
| 230: Conducting end ring | 300: Conventional three phase winding connection |
| 235: Air gap | 400: Six phase winding connection |
| A, B, C: Phases of a motor | 305: First set |
| A1, A2, A3, A4: Coils of phase A | 310: Second set |
| B1, B2, B3, B4: Coils of phase B | |

We claim:
1. An electrical machine of a vehicle, comprising:
a rotor; and
a stator,
wherein
the stator includes circumferentially spaced twelve slots;
the twelve slots comprises a plurality of winding connection;
the plurality of winding connection comprises two sets of three phase winding: a first set of three phase windings and a second set of three phase windings;
each phase of the two sets of three phase windings comprises two or more set of coils;
the two or more set of coils are shifted by an electrical angle 30 degrees ($\theta_e$) with respect to each other, and the electrical machine is a motor, the motor being a two pole three phase motor, and wherein the two pole three phase motor has a poly-phase offset of at least one slot between at least one leading slot and at least one lagging slot.

2. The electrical machine of a vehicle as claimed in claim 1, wherein two or more set of coils includes a first set of coils and a second set of coils of separate three phases of the stator winding.

3. The electrical machine of a vehicle as claimed in claim 2, wherein the second set is leading with respect to the first set.

4. The electrical machine of a vehicle as claimed in claim 1, wherein each phase of the two sets of three phase winding includes two or more coils.

5. The electrical machine of a vehicle as claimed in claim 4, wherein the two or more coils in each phase of the two sets of three phase winding are connected in series with each other.

6. The electrical machine of a vehicle as claimed in claim 1, wherein the first set and the second set have separate power supply.

7. The electrical machine of a vehicle as claimed in claim 2, wherein the first set and the second set includes two or more coils having similar wave form.

8. The electrical machine of a vehicle as claimed in claim 1, wherein the twelve slots include one or more leading slots and one or more lagging slots.

9. The electrical machine of a vehicle as claimed in claim 1, wherein a back-EMF induced by a rotor magnetic field, in the leading slot is 30 degrees leading.

10. The electrical machine of a vehicle as claimed in claim 9, wherein a current supply in the leading slot is at 30-degree difference with respect to the current supplying in the lagging slot.

11. The electrical machine of a vehicle as claimed in claim 1, wherein the two pole three phase motor has a poly-phase offset in the windings of one slot.

12. The electrical machine of a vehicle as claimed in claim 1, wherein the stator windings are connected in a wye configuration.

13. The electrical machine of a vehicle as claimed in claim 1, wherein the stator windings are connected in a delta configuration.

* * * * *